(12) United States Patent
Wang

(10) Patent No.: US 6,286,054 B2
(45) Date of Patent: *Sep. 4, 2001

(54) METHOD AND SYSTEM FOR SUPPORTING MULTIPLE CAPTURE DEVICES

(75) Inventor: John Wang, San Jose, CA (US)

(73) Assignee: FlashPoint Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/957,854
(22) Filed: Oct. 27, 1997
(51) Int. Cl.[7] .................................................. G06F 13/00
(52) U.S. Cl. .............................. 709/321; 710/64; 709/328
(58) Field of Search .................................. 709/300, 301, 709/328, 321, 322, 323; 710/64

(56) References Cited

U.S. PATENT DOCUMENTS

| | | | |
|---|---|---|---|
| 5,265,252 | * 11/1993 | Rawson, III et al. | 709/301 |
| 5,680,618 | * 10/1997 | Freund | 707/7 |
| 5,878,056 | * 3/1999 | Black et al. | 709/301 |
| 5,961,620 | * 10/1999 | Trent et al. | 710/105 |
| 6,003,093 | * 12/1999 | Kester | 709/301 |

* cited by examiner

Primary Examiner—Dung C. Dinh
(74) Attorney, Agent, or Firm—Sawyer Law Group LLP

(57) ABSTRACT

A system and method for allowing a host to support a plurality of capture devices have been disclosed. The host includes a application program. In one aspect, the method and system include providing a first digital imaging device module, providing an interface layer, and providing a second digital imaging device module. The first digital imaging device module includes information relating to a first digital imaging device and is for controlling and providing connectivity to the first digital imaging device. The interface layer is for communicating between the application and the first digital imaging device module. The second digital imaging device module includes information relating to a second digital imaging device. The second digital imaging device module is for controlling and providing connectivity to the second digital imaging device and is accessible by the application through the interface layer. In another aspect, the method and system include providing a plurality of capture device modules and providing an interface control layer. Each capture device module corresponds to each of the plurality of capture devices. Each capture device module controls, provides a user interface for, and provides connectivity to the corresponding capture device. The interface control layer is for communicating between the application and each of the plurality of control device modules.

37 Claims, 4 Drawing Sheets

METHOD AND SYSTEM FOR SUPPORTING MULTIPLE CAPTURE DEVICES

FIELD OF THE INVENTION

The present invention relates to image capture devices and more particularly to a method and system for supporting multiple capture devices in a host system.

BACKGROUND OF THE INVENTION

Currently, image capture devices, including digital cameras and other image capture devices, are used to obtain multimedia content. This multimedia content may include digital images, any sound annotating the image, and tags containing information about the image. Typically, a host such as a computer is used to view, print, edit and otherwise manipulate data from a capture device. In order to retrieve data from a capture device, an application on the host must be capable of communicating with the image capture device. A user interface is also provided to allow the user to control the host's communication with the capture device, for example to choose which data is transferred from the capture device to the host.

Typically, a conventional TWAIN data source both provides the user interface for the capture device and connectivity to the capture device. In the context of this application, connectivity includes the physical connection to the capture device, for example via USB (Uniform Serial Bus), the accompanying protocols, and control of or communication with the capture device. Although a conventional TWAIN data source does allow communication with a capture device, such a conventional TWAIN data source is specific to a particular capture device. For example, one TWAIN data source would be used to communicate with a given digital camera. If an application on the host is to communicate with a different type of digital camera or other capture device, a completely new TWAIN data source must be provided. Thus, a developer desiring to allow an application to communicate with another capture device must provide both the user interface and the connectivity for the new capture device through a completely new TWAIN data source. Moreover, a conventional TWAIN data source can only acquire data. An application using a conventional TWAIN data source can, therefore, only receive data from a particular capture device. Finally, the conventional TWAIN data source also takes control of the host when acquiring data, precluding the user from accessing other features of the application while the conventional TWAIN data source is working.

Some conventional monolithic applications are capable of directly communicating with multiple capture devices. Such applications have built-in support for multiple cameras. As a result, such a conventional application can provide connectivity for each of the plurality cameras the application supports. However, once the capture devices supported are set, new capture devices cannot be supported without rewriting the application. Consequently, the number and type of capture devices supported by such conventional applications is limited to those chosen when the application was developed.

Accordingly, what is needed is a system and method for supporting a plurality of different capture devices on a host which requires minimal software development. The present invention addresses such a need.

SUMMARY OF THE INVENTION

The present invention provides a method and system for allowing a host, which includes an application program, to support a plurality of capture devices. In one aspect, the method and system comprise providing a first digital imaging device module, providing an interface layer, and providing a second digital imaging device module. The first digital imaging device module includes information relating to a first digital imaging device and is for controlling and providing connectivity to the first digital imaging device. The interface layer is for communicating between the application and the first digital imaging device module. The second digital imaging device module includes information relating to a second digital imaging device. The second digital imaging device module is for controlling and providing connectivity to the second digital imaging device and is accessible by the application through the interface layer. In another aspect, the method and system comprise providing a plurality of capture device modules and providing an interface control layer. The plurality of capture device modules corresponds to the plurality of capture devices. Each capture device module is for controlling, providing a user interface for, and providing connectivity to the corresponding capture device. The interface control layer is for communicating between the application and each of the plurality of control device modules.

According to the system and method disclosed herein, the present invention allows a host to relatively easily support a plurality of capture devices and include new capture devices.

DETAILED DESCRIPTION OF THE INVENTION

The present invention relates to an improvement in communication with image capture devices. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
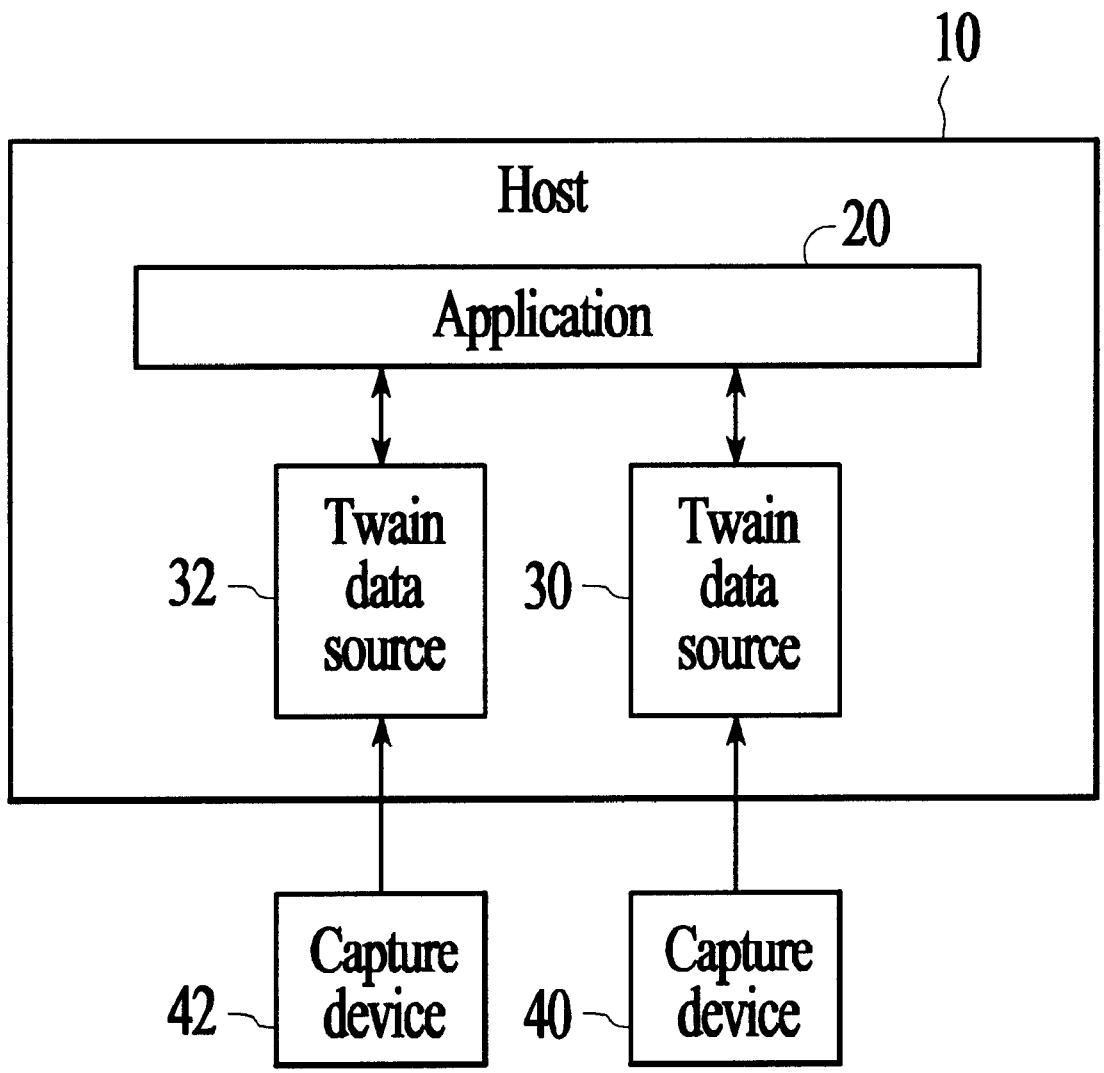
FIG. 1 is a block diagram of a host system communicating with a capture device.

FIG. 1 is a block diagram of a conventional method for coupling a host 10 to a capture device 40. An application 20 on the host 10 is not specific to a particular capture device 40. Therefore, the application 20 uses a conventional TWAIN data source 30 to communicate with the capture device 40. The conventional TWAIN data source 30 provides the user interface for the capture device and connectivity to the capture device 40. In the context of this application, connectivity includes the physical connection to the capture device, for example via serial USB (Uniform Serial Bus), IRDA, firewire, and the accompanying protocols, as well as control of or communication with the capture device.

To acquire data from the capture device 40, the application 20 transfers control of the host 10 to the conventional TWAIN data source 30. The conventional TWAIN data source 30 then provides a user interface and communicates with the capture device to acquire the appropriate data. While the conventional TWAIN data source 30 is working, the user cannot switch to another application, not shown. The conventional TWAIN data source 30 provides the requested data from the capture device to the application 20 and, when finished, transfers control over the host 10 back to the application 20.

Although the conventional TWAIN data source 30 allows the application 20 to communicate with the capture device 40, one of ordinary skill in the art will readily realize that the conventional TWAIN data source 30 is specific to a particular capture device 30. For example, one TWAIN data source would be used to communicate with a given digital camera. If the application 20 on the host 10 is to communicate with a different type of digital camera or other capture device, a completely new TWAIN data source must be provided. Thus, a developer desiring to allow the application 10 to communicate with a capture device having a different connectivity or a different user interface must provide both a new user interface and a new source of connectivity for the capture device by creating a new TWAIN data source. Moreover, one of ordinary skill in the art will readily realize that a TWAIN data source can only acquire data. Thus, an application using a conventional TWAIN data source can only receive data from a particular capture device.

Some conventional monolithic applications are capable of directly communicating with multiple capture devices. These conventional monolithic applications include ADOBE PHOTODELUXE and MICROSOFT PICTURE IT. Such applications have built-in support for multiple cameras. To accomplish this, the software development kit for a camera that is supported by the application is linked to the application. As a result, such a conventional application provides the features of each of the plurality camera the application supports. For example, if the capture device can receive communications from a host, the conventional monolithic application will support this feature. However, one of ordinary skill in the art will readily recognize that once the capture devices supported are set, the conventional application must be rewritten if it is to support new capture devices. Consequently, the number and type of capture devices supported by such conventional applications is limited.

The present invention provides for a method and system for supporting a plurality of capture devices on a host while requiring minimal software development for each new capture device supported. In addition, the application can be made to support new capture devices not chosen or in existence at the time the application was developed. The present invention will be described in terms of supporting a plurality of capture devices, such as digital cameras, on a host system. However, one of ordinary skill in the art will readily recognize that this method and system will operate effectively for other types of image capture devices.

Figure 2:
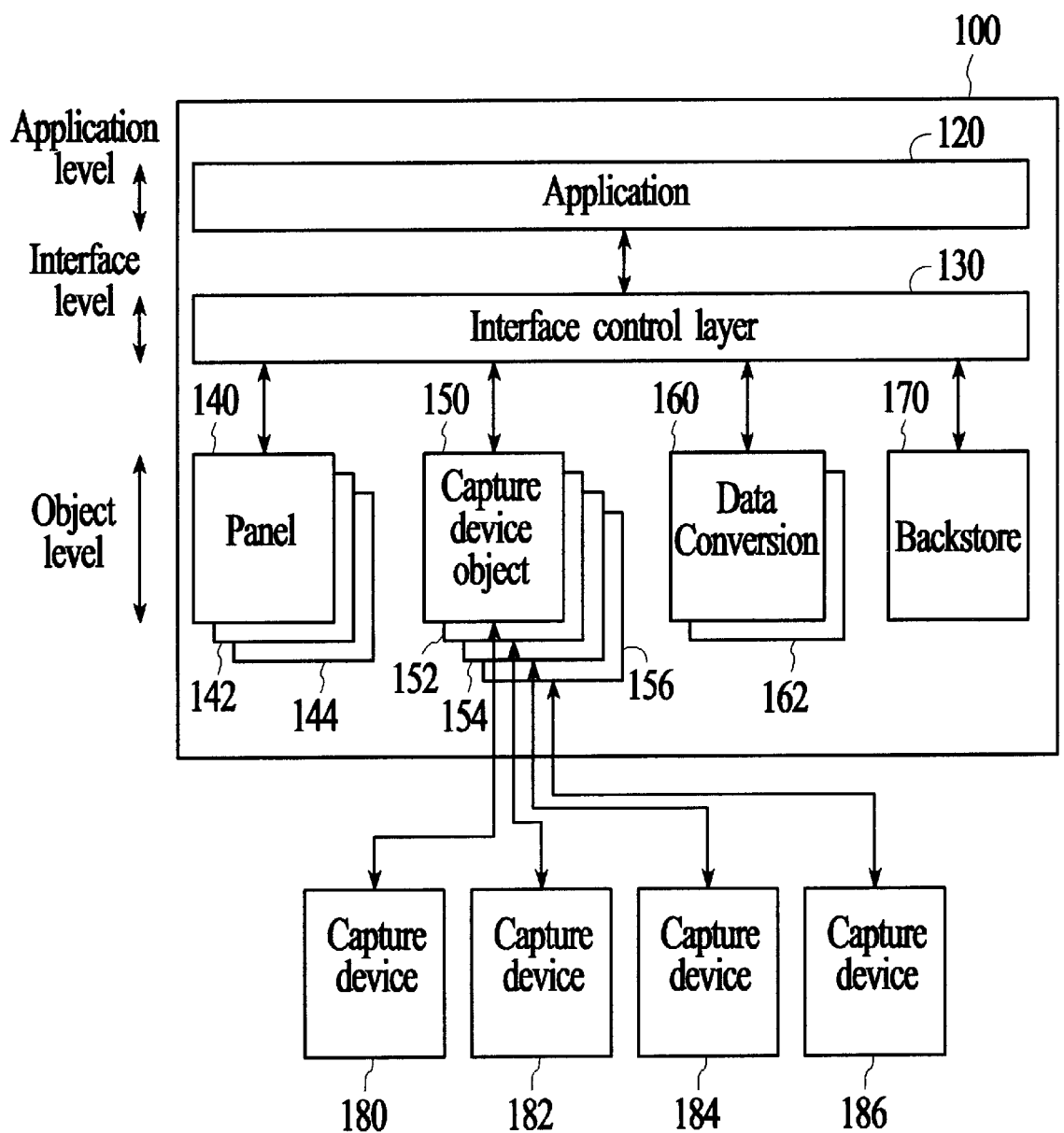
FIG. 2 is a block diagram of one embodiment of a system for supporting multiple capture devices in accordance with the method and system.

To more particularly illustrate the method and system in accordance with the present invention, refer now to FIG. 2 depicting a block diagram of one embodiment of a host 100 that can support multiple capture devices 180–186 with minimal additional software development. The host 100 includes an application 120. The application 120 is not specific to a particular capture device 180–186, but may utilize a capture device 180–186, for example as a source of data. The application 20 interfaces with an interface layer 130.

In one embodiment, the interface layer 130 communicates with various software objects, including multiple instances of panels 140, 142, and 144; multiple capture device objects 150, 152, 154, and 156; multiple data conversion instances 160 and 163; and a backstore 170. The data conversion instances 160 and 162 allow data in one format, for example JPEG, from a capture device 180–186 to be converted to a backstore 170. The data conversion instances 160 and 162 also allow the backstore 170 to be written out to another format. Conversion between the backstore 170 and other file formats is discussed more fully in U.S. patent application Ser. No. 08/958,072 entitled "METHOD AND SYSTEM FOR ABSTRACTING MULTIMEDIA DATA FOR EDITING DATA FROM VARIOUS FILE FORMATS" filed on Oct. 27, 1997 which is assigned to the assignee of the present invention abandoned. Applicant hereby incorporates by reference the above-mentioned co-pending application. Although two data conversion instances 160 and 162 and one backstore 170 are shown, nothing prevents the use of another number of data conversion instances or backstores.

Figure 3:
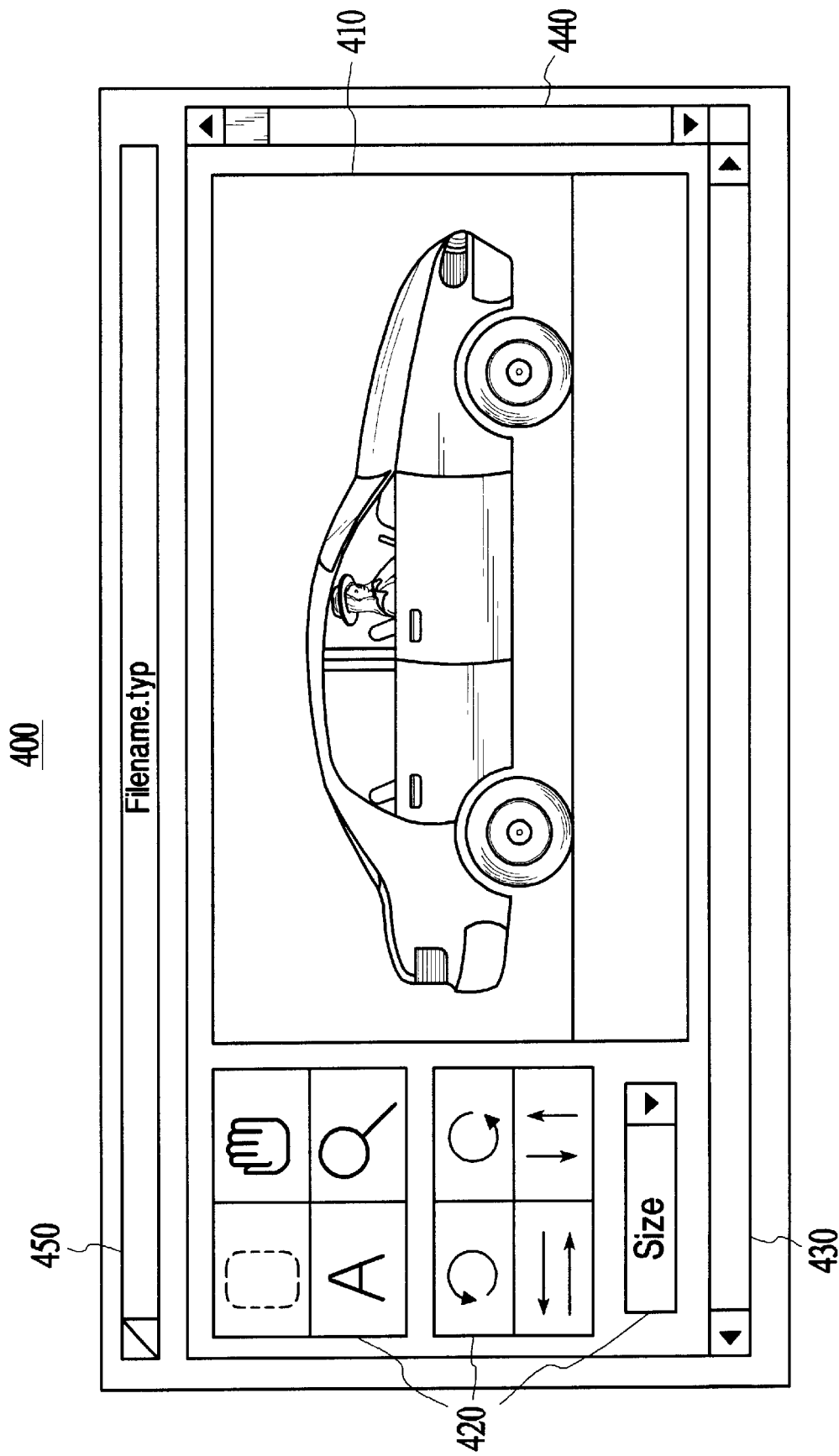
FIG. 3 is a diagram depicting the user interface provided by a panel.

In accordance with the method and system, the user interface and connectivity are provided by modules at the object level. The interface layer 130 communicates with the application and the modules providing the user interface and connectivity. In a preferred embodiment, the user interface and connectivity for the capture devices 180–186 are separated. Panels 140, 142, and 144 each provide a user interface. For example, panel 140 might provide a user interface for a first camera manufacturer. The panel 142 would provide a user interface for a second camera manufacturer. The panel 144 would provide a third user interface for a third camera manufacturer. For illustrative purposes, FIG. 3 depicts one embodiment of the user interface 400 provided by the panel 140. In the embodiment depicted in FIG. 3, the user interface 400 includes a representation of the image 410, tools 420 for editing the image 410, tools for scrolling across the image 430 and 440, and a status bar indicating the name of the image file being viewed 450. The interfaces supported by the panels 142 and 144 may appear different from the user interface 400. Consequently, the host 100 is capable of supporting multiple user interfaces and multiple cameras. Although three user interfaces, panels 140, 142, and 144, are shown to be supported by the host 100, nothing prevents the method and system from being used with another number of panels.

Capture device objects 150–156 each provide connectivity to and communication with a corresponding capture device 180–186, respectively. However, nothing prevents a capture device objects 150–156 from corresponding to more than one capture device 180–186. Each capture device objects 150–156 includes a command set. In a preferred embodiment, the command set is a set of Application Program Interfaces (APIs). The set of APIs allow the capture device objects 150–156 to control the associated capture device 180–186, respectively. For example, one API may allow the capture device object 150 to retrieve parameters from the capture device 180. Such operations are described more fully in U.S. Pat. No. 6,163,816 entitled "SYSTEM AND METHOD FOR RETRIEVING PARAMETERS IN AN ELECTRONIC IMAGING DEVICE" filed on Aug. 29, 1997 and assigned to the assignee of the present invention. Applicant hereby incorporates the above-mentioned co-pending application by reference.

Each capture device objects 150–156 also corresponds to one of the panels 140–144. For example, capture device objects 150 and 152 might use the same panel 140 as a user interface. Different connectivities can be created with the same or similar user interface by allowing multiple capture device objects 150–156 to correspond to the same user interface, or panel. For example, both capture device objects 150 and 152 may use the first camera manufacturer's user interface of panel 140, but the connectivity to the capture device 180 in capture device object 150 may be via USB, while the capture device object 152 may provide a connectivity other than USB. Capture device objects 154 and 156 might correspond to panels 142 and 144, respectively. As a result of the cooperation between panels 140–144 and capture device objects 150–156, both the user interface and connectivity to capture devices 180–186 are provided. Note that although the host 100 is shown as having four capture device objects 150–156, nothing prevents the method and system from using another number of capture device objects.

In operation, the application 120 and other objects, such as panels 140–144, communicate to a capture device objects 150–156 through the interface layer 130. Therefore, the application 120 and other software objects also communicate to the capture devices 180–186 through the interface layer 130. In order to facilitate this communication, in a preferred embodiment, the interface layer 130 replicates the APIs of a selected capture device objects 150–156 to the interface layer 130. The interface layer 130 then retains the APIs of the selected capture device object 150–156 as long as the particular capture device 180–186 is selected. As a result, the interface layer 130 is reconfigured when a new capture device 180–186 and, therefore, a new capture device objects 150–156 is selected. In a preferred embodiment, only one capture device is selected at a single time. However, nothing prevents the method and system from allowing the use of a plurality of capture devices at a single time.

Figure 4:
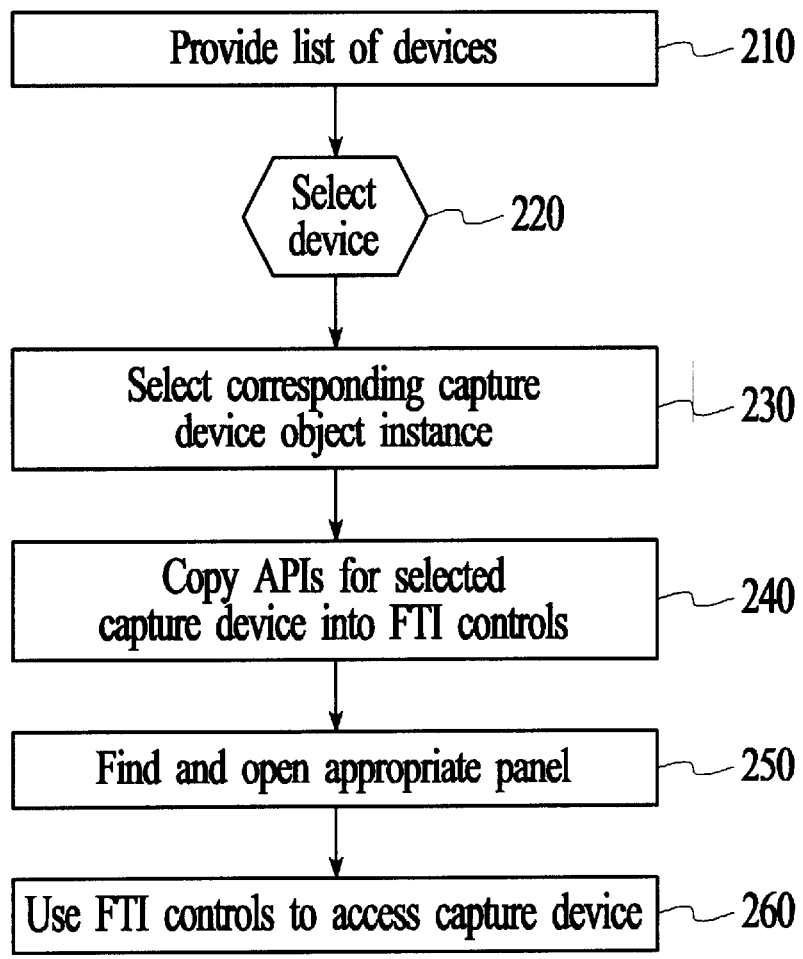
FIG. 4 is a flow chart depicting one method for communicating with one of a plurality of capture devices in accordance with the method and system.

Refer now to FIG. 4 which depicts one embodiment of a method 200 for supporting communication from the host 100 to one of the multiple capture devices 180–186. First, a list of capture devices 180–186 supported is provided to the user in step 210. The user then selects the appropriate capture device 180–186 in step 220. The appropriate capture device objects 150–156 is then selected via step 230. The APIs from the appropriate capture device objects 150–156 are then copied into the interface layer 130 through step 240. The panel 140–144 corresponding to the appropriate capture device objects 150–156 is then found and opened via step 250. Via step 260, the interface layer 130 is used to access the selected capture device 180–186 through the appropriate capture device objects 150–156. Thus, the application 120 and the corresponding panel 140–144 communicate with the appropriate capture device objects 150–156 through the interface layer 130.

Because all communication to and from each capture device 180–186 is through the APIs copied to the interface layer 130, the application 120 can interface with multiple capture devices 180–186. The protocols for communicating with a particular capture device 180–186 are imbedded in each capture device objects 150–156 and copied to the interface layer 130. At the level of the application 120, therefore, there is no need to follow the protocols of a particular capture device 180–186. Instead, once the user or application 120 selects the capture device 180–186, the application 120 can communicate with any supported capture device 180–186, as well as to any other software object, as long as any guidelines for using the APIs replicated in the interface layer 130 are followed. As a result, the software development kits for specific supported capture devices need not be provided or incorporated into the application 120.

Figure 5:
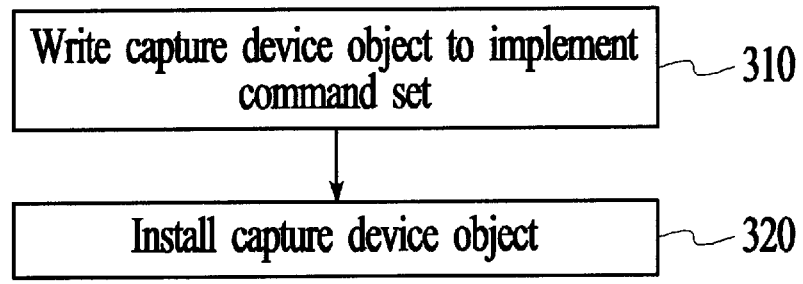
FIG. 5 is a flow chart depicting one method for providing a new capture device in accordance with the method and system.

The capture device objects 150–156 and panels 140–144 are also stand alone software objects. Thus, they are provided at run time, loaded when the system reboots, or loaded when the application 120 searches for and builds a list of objects available rather than incorporated into the application. This feature makes the user interface and connectivity for the supported capture devices 180–186 modular in nature and relatively easily added by adding a single file. As a result, instead of having a monolithic application limited to specific pre-selected capture devices, new capture devices can be supported by adding a new module containing the connectivity or user interface for the new capture device. because the user interface and connectivity have been separated into the panels 140–144 and capture device objects 150–156, software development for new capture devices, not shown, is also simplified. Refer now to FIG. 5 depicting one method 300 for software development for supporting a new capture device. The developer writes the capture device object to implement the command set via step 310. Although not depicted, the developer can also provide a panel and application if desired. The capture device object 150–156 is then installed on the host 100 in step 320. Thus, each capture device object 150–156 is provided at the object level. The APIs provided by the developer in the capture device object 150–156 are replicated into the interface layer 130 when a user selects the new capture device for use.

If the capture device is compatible with a user interface for one of the preexisting panels 140–144, the developer would be finished. If, however, the developer wished to create another user interface, a new panel would be created, via step 320. If the preexisting application 120 is used, software development would be completed. If, however, a new application is desired, it should be provided via step 330. Because the user interface and connectivity for the capture device are split into panels 140–144 and capture device objects 150–156, respectively, a developer can provide merely the core commands for the capture device at the object level. Consequently, in contrast to conventional systems, a new capture device can be supported with minimal additional software development. In addition, because the individual command sets for each capture device 180–186 are provided in capture device objects 150–156, the application may support features such as transferring data both to and from capture devices. Finally, the application 120 need not completely relinquish control of the host 100 while the interface layer 130 communicates with a capture device through capture device objects 150–156. As a result, a user may continue to use the application 120 while communication between the host 100 and a capture device is ongoing.

A method and system has been disclosed for supporting multiple capture devices on a host. The method and system use stand alone software objects to provide the user interface and connectivity for a capture device. An interface layer provide communication between the software objects and between the application and each software object. Consequently, new capture devices can be relatively easily supported.

Although the present invention has been described in accordance with the embodiments shown, one of ordinary skill in the art will readily recognize that there could be variations to the embodiments and those variations would be within the spirit and scope of the present invention.

Accordingly, many modifications may be made by one of ordinary skill in the art without departing from the spirit and scope of the appended claims.

What is claimed is:

1. A method for allowing a host to support a plurality of digital imaging devices, the host including a application program, the method comprising the steps of:

providing a first digital imaging device module including information relating to a first digital imaging device, the first digital imaging device module for controlling and providing a first connectivity to the first digital imaging device, the first connectivity to the first digital imaging device including providing control of a first physical connection to the first digital imaging device and controlling communication with the first digital imaging device;

providing an interface layer, the interface layer supporting a plurality of protocols for communicating between the application and the first digital imaging device module, the interface layer communicating with the first digital imaging device module using a first protocol; and loading a second digital imaging device module, the second digital imaging device module including information relating to a second digital imaging device, the second digital imaging device module for controlling and providing a second connectivity to the second digital imaging device, the second digital imaging device module communicating with the interface layer using a second protocol, the second digital imaging device being accessible by the application through the interface layer, the second connectivity to the second digital imaging device including providing control of a second physical connection to the second digital imaging device and controlling communication with the second digital imaging device;

wherein the interface layer, the first digital imaging device module and the second digital imaging device module allow communication between the application and the first digital imaging device and between the application and the second without requiring specialized software in the application.

2. The method of claim 1 wherein the step of providing the first digital imaging device module further includes the step of:

providing a first digital imaging device object corresponding to the first digital imaging device, the first digital imaging device object for controlling and providing connectivity to the first digital imaging device.

3. The method of claim 2 wherein the step of providing the second digital imaging device module further includes the step of:

providing a second digital imaging device object corresponding to the second digital imaging device, the second digital imaging device object for controlling and providing connectivity to the second digital imaging device.

4. The method of claim 3 further comprising the step of:

providing a first panel corresponding to the first digital imaging device object, the first panel for providing a user interface for the first digital imaging device object.

5. The method of claim 4 further comprising the step of:

providing a second panel corresponding to the second digital imaging device object, the second panel for providing a user interface for the second digital imaging device object.

6. The method of claim 4 wherein the step of providing the first digital imaging device object further includes the step of:

providing a first command set for controlling the first digital imaging device.

7. The method of claim 6 wherein the step of providing the second digital imaging device object further includes the step of:

providing a second command set for controlling the second digital imaging device.

8. The method of claim 7 wherein the first digital imaging device object further includes a currently selected digital imaging device object, the currently selected digital imaging device object corresponding to the currently selected digital imaging device.

9. The method of claim 1 wherein each of the first digital imaging device module includes a first command set for controlling the first digital imaging device and the second digital imaging device module includes a second command set for controlling the second digital imaging device, the method further comprising the step of:

copying a command set of a currently selected digital imaging device module of the first digital imaging device module and the second digital imaging device module to the interface layer.

10. The method of claim 9 wherein the first digital imaging device module further includes a first object oriented module.

11. The method of claim 10 wherein the second digital imaging device module further includes a second object oriented module.

12. The method of claim 11 wherein the first command set further includes a first plurality of application program interfaces (APIs) for controlling the first digital imaging device.

13. The method of claim 12 wherein the second command set further includes a second plurality of application program interfaces (APIs) for controlling the second digital imaging device.

14. The method of claim 13 wherein the interface layer further provides communication between a first panel for providing a first user interface corresponding to at least one of the first digital imaging device module and the second digital imaging device module and the first digital imaging device module.

15. The method of claim 14 wherein the first digital imaging device further comprises a first digital camera.

16. The method of claim 15 wherein the second digital imaging device further comprises a second digital camera.

17. A system for allowing a host to support a plurality of digital imaging devices, the host including a application program, the system comprising:

a plurality of digital imaging device modules corresponding to the plurality of digital imaging devices, each digital imaging device module for controlling, providing a user interface for, and providing connectivity to the corresponding digital imaging device, the connectivity to the corresponding digital imaging device including providing control of a physical connection to the corresponding digital imaging device and controlling communication with the corresponding digital imaging device; and an interface layer for communicating between the application and each of the plurality of digital imaging device modules, the interface layer supporting a plurality of protocols for communicating with each of the plurality of digital imaging device modules;

wherein the interface layer and the plurality of digital imaging device modules allow communication between the application and the plurality of digital imaging devices without requiring specialized software in the application.

18. The system of claim 17 wherein the plurality of digital imaging device modules further includes:

a plurality of digital imaging device objects corresponding to the plurality of digital imaging devices, the plurality of digital imaging device objects for controlling and providing connectivity to the plurality of corresponding digital imaging devices; and at least one panel, each panel of the at least one panel corresponding to at least one of the plurality of digital imaging device objects, each of the at least one panel for providing a user interface for the corresponding at least one digital imaging device object.

19. The system of claim 18 wherein the plurality of digital imaging device objects further includes:

a plurality of command sets for controlling the plurality of corresponding digital imaging devices.

20. The system of claim 19 wherein the plurality of digital imaging device objects further includes a currently selected digital imaging device object, the currently selected digital imaging device object corresponding to a currently selected digital imaging device.

21. The system of claim 17 wherein the plurality of digital imaging device modules include a plurality of digital imaging devices, each of the plurality of digital imaging device modules includes a command set of the plurality of command sets for controlling the corresponding digital imaging device and wherein the interface layer further includes a copy of the command set corresponding to a currently selected digital imaging device module.

22. The system of claim 21 wherein each of the plurality of digital imaging device modules further comprises at least one object oriented module.

23. The system of claim 22 wherein each of the plurality of command sets further includes a plurality of application program interfaces (APIS) for controlling the corresponding digital imaging device.

24. The system of claim 23 wherein the interface layer further provides communication between each of a plurality of panels corresponding to the plurality of digital imaging device modules, each of the plurality of panels for providing a user interface for at least one corresponding digital imaging device module, and the at least one corresponding digital imaging device module.

25. The system of claim 24 wherein the plurality of digital imaging devices further includes at least one digital camera.

26. A computer-readable medium including a program for allowing a host to support a plurality of digital imaging devices, the host including an application program, the program containing instructions for:

allowing a user to provide a plurality of capture device modules corresponding to the plurality of capture devices, the plurality of capture device modules for controlling, providing a user interface for, and providing connectivity to the corresponding capture device, the connectivity to the corresponding digital imaging device including providing control of a physical connection to the corresponding digital imaging device and controlling communication with the corresponding digital imaging device; and providing an interface control layer, the interface control layer supporting a plurality of protocols for communicating between the application and each of the plurality of control device modules, the interface layer communicating with each of the plurality of control device modules using a protocol of the plurality of protocols;

wherein the interface layer and the plurality of digital imaging device modules allow communication between the application and the plurality of digital imaging devices without requiring specialized software in the application.

27. The computer-readable medium of claim 26 wherein the instruction for allowing a user to provide a plurality of capture device modules further includes instructions for:

allowing a user to provide a plurality of capture device objects corresponding to the plurality of capture devices, the plurality of capture device objects for controlling and providing connectivity to the plurality of corresponding capture devices;

providing at least one panel, each panel of the at least one panel corresponding to at least one of the plurality of capture device objects, each of the at least one panel for providing a user interface for the corresponding at least one capture device object; and wherein the interface control layer is for communicating between the application and each of the plurality of capture device objects.

28. The computer-readable medium of claim 27 wherein the instruction for allowing a user to provide the plurality of capture device objects further includes an instruction for:

allowing a user to provide a plurality of corresponding command sets for controlling the plurality of corresponding capture devices.

29. The computer-readable medium of claim 28 wherein the plurality of capture device objects further includes a currently selected capture device object, the currently selected capture device object corresponding to a currently selected capture device.

30. The computer-readable medium of claim 26 wherein the plurality of digital imaging device modules include a plurality of command sets, each of the plurality of digital imaging device modules includes a command set of the plurality of command sets for controlling a corresponding digital imaging device and wherein the program further includes instructions for:

copying the command set of the plurality of command sets corresponding to a currently selected capture device object to the control interface layer.

31. The computer-readable medium of claim 30 wherein each of the plurality of capture device modules further includes at least one object oriented module.

32. The computer-readable medium of claim 31 wherein each of the plurality of command sets further comprises a plurality of application program interfaces (APIs) for controlling the corresponding capture device.

33. The computer-readable medium of claim 32 wherein the control interface layer further provides communication between each of the plurality of panels and the at least one corresponding capture device object.

34. The computer-readable medium of claim 33 wherein the plurality of capture devices further comprises at least one digital camera.

35. The method of claim 1 further comprising the step of:

providing a plurality of panels, each panel of the plurality of panels corresponding to at least one digital imaging device module of the first digital imaging digital imaging device module and the second digital imaging device panel, each of the plurality of panels for providing a user interface for the corresponding at least one digital imaging device module;

wherein the host is capable of supporting a plurality of user interfaces corresponding to the plurality of panels.

36. The system of claim 17 further comprising:

a plurality of panels, each panel of the plurality of panels corresponding to at least one of the plurality of digital imaging device modules, each of the plurality of panels for providing a user interface for the corresponding at least one digital imaging device module;

wherein the system is capable of supporting a plurality of user interfaces corresponding to the plurality of panels.

37. The computer-readable medium of claim 26 wherein the program further includes instructions for:

providing a plurality of panels, each panel of the plurality of panels corresponding to at least one digital imaging device module of the first digital imaging digital imaging device module and the second digital imaging device panel, each of the plurality of panels for providing a user interface for the corresponding at least one digital imaging device module;

wherein the host is capable of supporting a plurality of user interfaces corresponding to the plurality of panels.

* * * * *